US005884201A

United States Patent [19]

Kawai

[11] Patent Number: 5,884,201

[45] Date of Patent: Mar. 16, 1999

[54] GEAR SHIFT CONTROL METHOD FOR ELECTRIC AUTOMOBILE

[75] Inventor: Junji Kawai, Tokyo, Japan

[73] Assignee: Mitsubishi Jidosha Kogyo Kabushiki Kaisha, Tokyo, Japan

[21] Appl. No.: 693,087

[22] PCT Filed: Dec. 8, 1995

[86] PCT No.: PCT/JP95/02525

§ 371 Date: Aug. 9, 1996

§ 102(e) Date: Aug. 9, 1996

[87] PCT Pub. No.: WO96/17742

PCT Pub. Date: Jun. 13, 1996

[30] Foreign Application Priority Data

Dec. 9, 1994 [JP] Japan .................................... 6-306735

[51] Int. Cl.[6] ...................................................... B60L 15/20

[52] U.S. Cl. .............................. 701/22; 701/51; 180/65.6

[58] Field of Search ................................. 701/22, 51, 55, 701/56; 180/65.1, 65.6, 65.7; 477/15, 20

[56] References Cited

U.S. PATENT DOCUMENTS

| | | | |
|---|---|---|---|
| 4,691,148 | 9/1987 | Nicholls et al. | 318/12 |
| 4,996,893 | 3/1991 | Nakamura et al. | 74/866 |
| 5,287,772 | 2/1994 | Aoki et al. | 74/846 |
| 5,542,754 | 8/1996 | Aoki et al. | 303/3 |
| 5,655,990 | 8/1997 | Ooyama et al. | 477/15 |

FOREIGN PATENT DOCUMENTS

| | | |
|---|---|---|
| 6174084 | 6/1994 | European Pat. Off. . |
| 4305054 | 2/1993 | Germany . |
| 50-43612 | 4/1975 | Japan . |
| 50-86024 | 7/1975 | Japan . |
| 52-17300 | 5/1977 | Japan . |
| 56-2486 | 1/1981 | Japan . |
| 58-176504 | 11/1983 | Japan . |
| 59-32384 | 2/1984 | Japan . |
| 5-168108 | 7/1993 | Japan . |
| 5-191904 | 7/1993 | Japan . |
| 5-284611 | 10/1993 | Japan . |

*Primary Examiner*—Michael Zanelli

[57] ABSTRACT

This invention relates to a gear shift method for an electric automobile, which is used upon changing a gear ratio of a transmission in the electric automobile. First, in step 1, when a change-over signal is outputted from a shift controller, output control of a motor, which has been performed in accordance with a stroke of an accelerator pedal, is canceled, and the transmission is changed into a neutral position. In next step 2, an output amount of the motor is controlled in accordance with a target motor output amount corresponding to a target motor output amount corresponding to a target motor rotation speed, the target motor rotation speed being calculated based on a vehicle speed at a time of the changing operation and a gear ratio of a selected target gear position. Then, in step 3, the transmission is changed into the target gear position. In subsequent step 4, an output of the motor is allowed to gradually return to an output amount corresponding to a stroke of the accelerator pedal. These features make it possible to perform a prompt and smooth change-over of a gear ratio even when the accelerator pedal remains depressed.

13 Claims, 10 Drawing Sheets

START

FIRST STEP
• CANCEL ACCELERATOR-PEDAL-STROKE-DEPENDENT MOTOR OUTPUT TORQUE CONTROL.
• CHANGE TRANSMISSION INTO NEUTRAL POSITION.

FIRST STEP COMPLETED ? NO / YES

SECOND STEP
• CALCULATE TARGET MOTOR ROTATION SPEED BASED ON VEHICLE SPEED UPON OUTPUT OF CHANGE-OVER SIGNAL AND GEAR RATIO OF SELECTED TARGET GEAR POSITION.
• SET TARGET MOTOR OUTPUT TORQUE CORRESPONDING TO TARGET MOTOR ROTATION SPEED.
• CONTROL MOTOR OUTPUT TORQUE IN ACCORDANCE WITH TARGET MOTOR OUTPUT TORQUE.

SECOND STEP COMPLETED ? NO / YES

THIRD STEP
• CHANGE TRANSMISSION TO TARGET GEAR POSITION.

THIRD STEP COMPLETED ? NO / YES

FOURTH STEP
• ALLOW MOTOR OUTPUT TORQUE TO GRADUALLY RETURN TO OUTPUT CORRESPONDING TO ACCELERATOR PEDAL STROKE.

FOURTH STEP COMPLETED ? NO / YES

END

F I G. 2
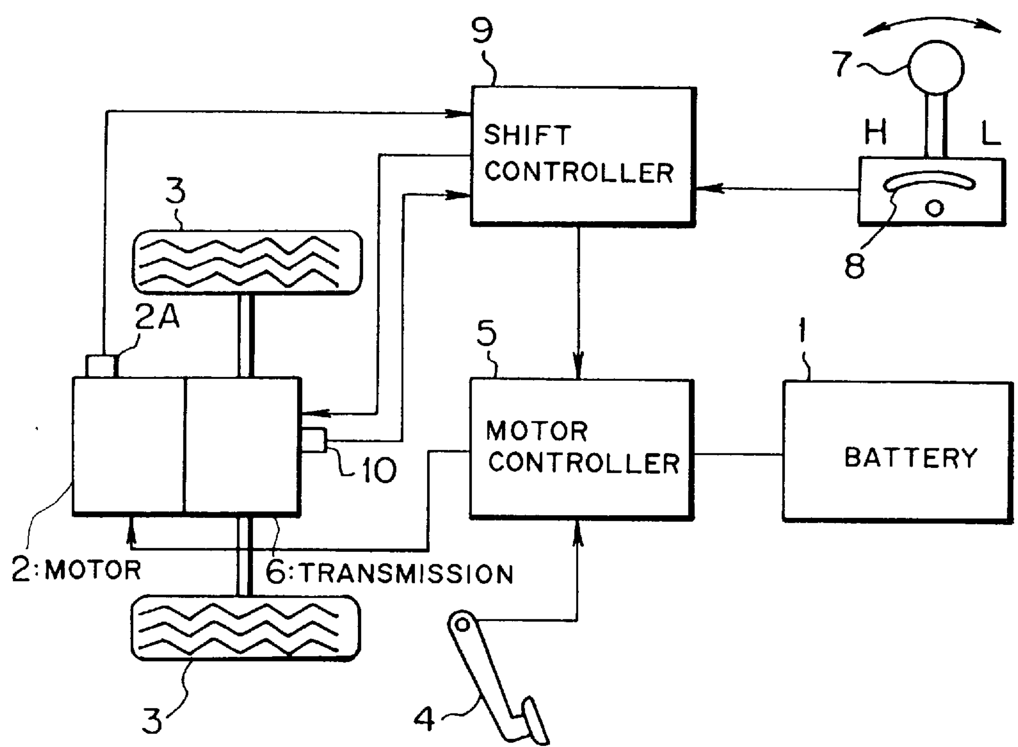

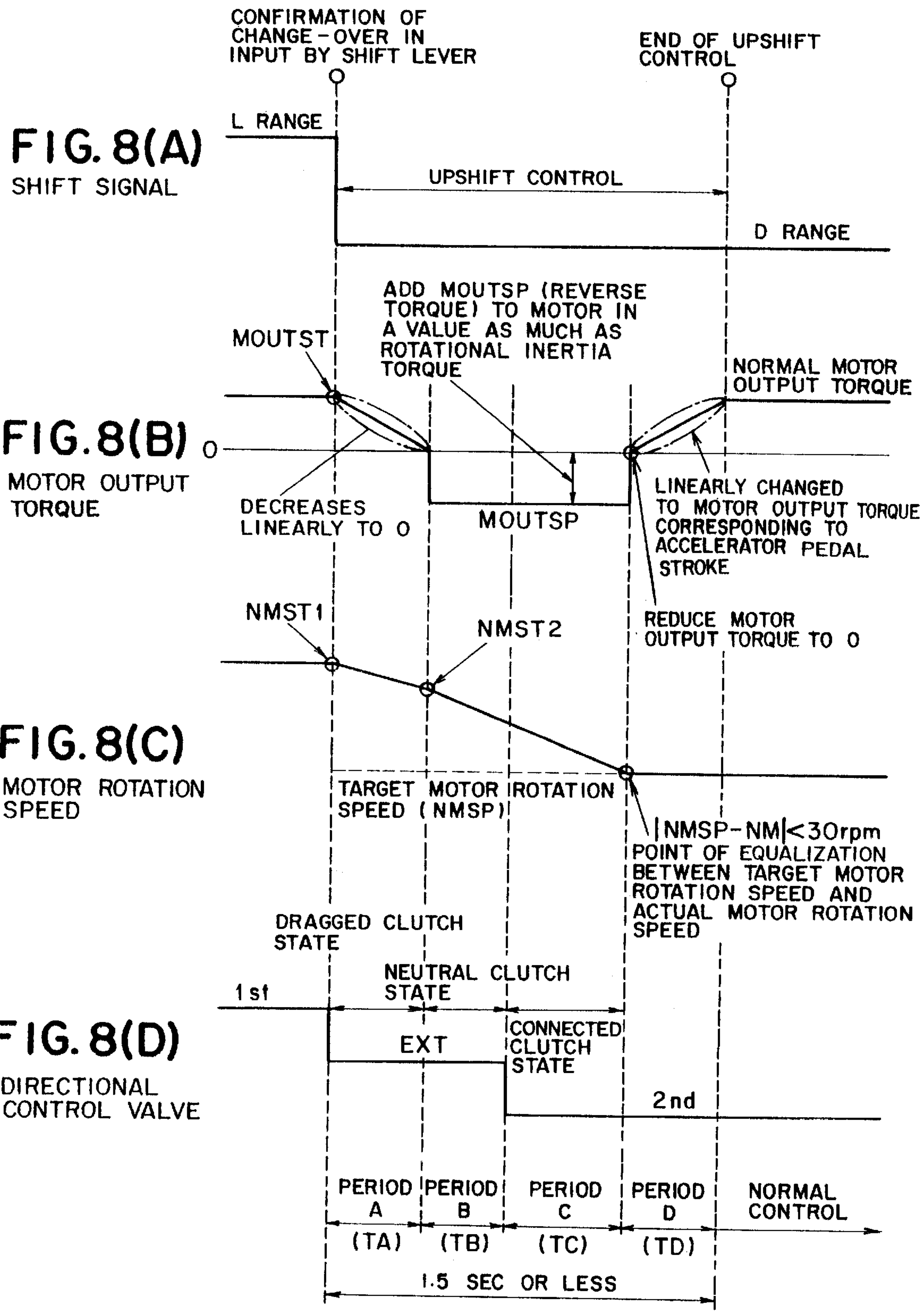
CONFIRMATION OF CHANGE-OVER IN INPUT BY SHIFT LEVER
END OF UPSHIFT CONTROL
FIG. 8(A)
SHIFT SIGNAL
L RANGE
UPSHIFT CONTROL
D RANGE
ADD MOUTSP (REVERSE TORQUE) TO MOTOR IN A VALUE AS MUCH AS ROTATIONAL INERTIA TORQUE
MOUTST
NORMAL MOTOR OUTPUT TORQUE
FIG. 8(B)
0
MOTOR OUTPUT TORQUE
DECREASES LINEARLY TO 0
MOUTSP
LINEARLY CHANGED TO MOTOR OUTPUT TORQUE CORRESPONDING TO ACCELERATOR PEDAL STROKE
REDUCE MOTOR OUTPUT TORQUE TO 0
NMST1
NMST2
FIG. 8(C)
MOTOR ROTATION SPEED
TARGET MOTOR ROTATION SPEED (NMSP)
|NMSP−NM|<30rpm
POINT OF EQUALIZATION BETWEEN TARGET MOTOR ROTATION SPEED AND ACTUAL MOTOR ROTATION SPEED
DRAGGED CLUTCH STATE
NEUTRAL CLUTCH STATE
1st
FIG. 8(D)
DIRECTIONAL CONTROL VALVE
EXT
CONNECTED CLUTCH STATE
2nd
PERIOD A
PERIOD B
PERIOD C
PERIOD D
NORMAL CONTROL
(TA)
(TB)
(TC)
(TD)
1.5 SEC OR LESS

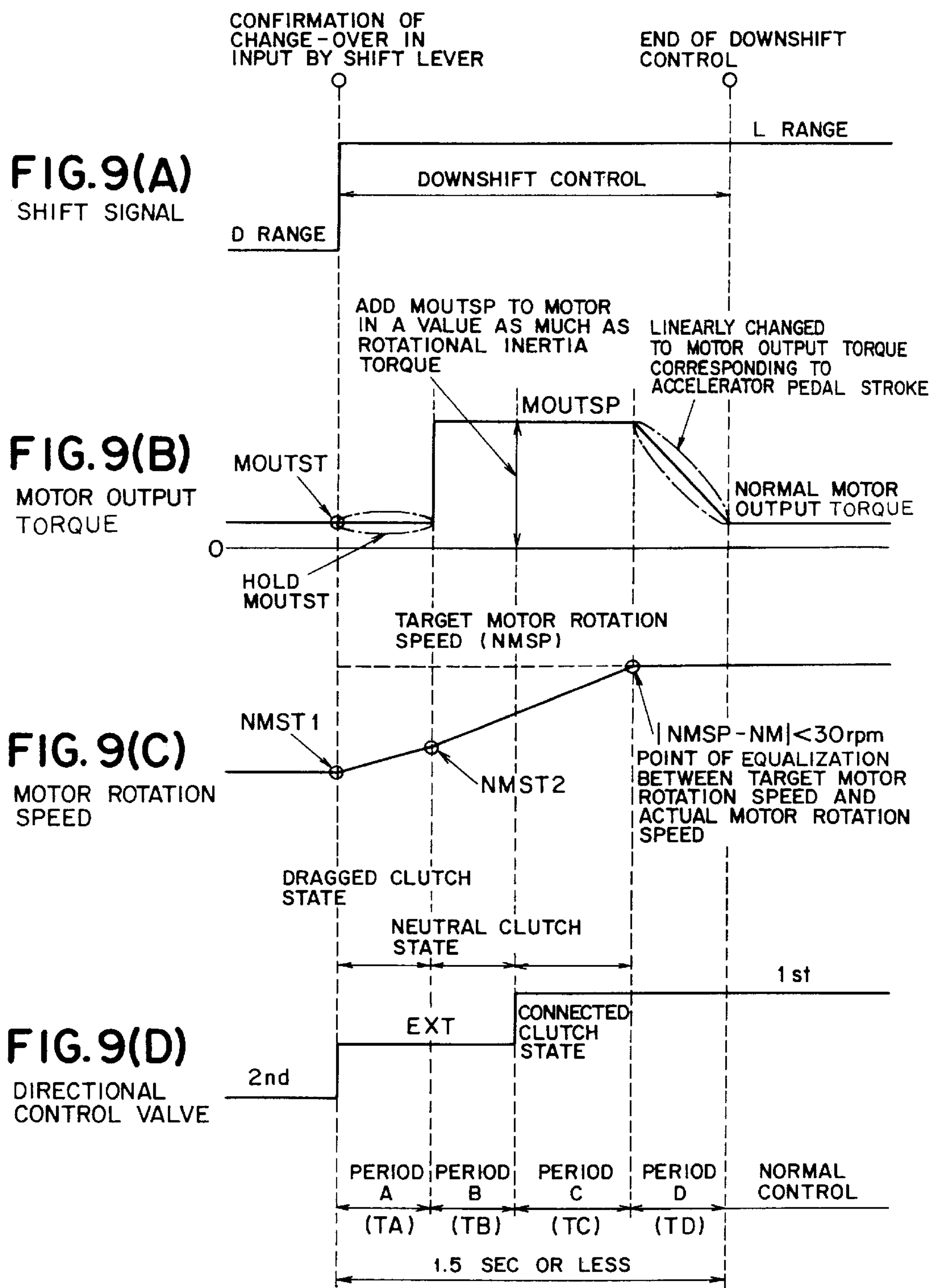
CONFIRMATION OF CHANGE-OVER IN INPUT BY SHIFT LEVER
END OF DOWNSHIFT CONTROL
L RANGE
FIG.9(A)
SHIFT SIGNAL
DOWNSHIFT CONTROL
D RANGE
ADD MOUTSP TO MOTOR IN A VALUE AS MUCH AS ROTATIONAL INERTIA TORQUE
LINEARLY CHANGED TO MOTOR OUTPUT TORQUE CORRESPONDING TO ACCELERATOR PEDAL STROKE
MOUTSP
FIG.9(B)
MOTOR OUTPUT TORQUE
MOUTST
NORMAL MOTOR OUTPUT TORQUE
O
HOLD MOUTST
TARGET MOTOR ROTATION SPEED (NMSP)
NMST1
FIG.9(C)
MOTOR ROTATION SPEED
NMST2
|NMSP-NM|<30rpm
POINT OF EQUALIZATION BETWEEN TARGET MOTOR ROTATION SPEED AND ACTUAL MOTOR ROTATION SPEED
DRAGGED CLUTCH STATE
NEUTRAL CLUTCH STATE
1st
EXT
CONNECTED CLUTCH STATE
FIG.9(D)
DIRECTIONAL CONTROL VALVE
2nd
PERIOD A
PERIOD B
PERIOD C
PERIOD D
NORMAL CONTROL
(TA)
(TB)
(TC)
(TD)
1.5 SEC OR LESS

GEAR SHIFT CONTROL METHOD FOR ELECTRIC AUTOMOBILE

TECHNICAL FIELD

This invention relates to an electric automobile which runs by transmitting an output from an electric motor to drive wheels via a transmission, and especially to a gear shift control method for the electric automobile, said method being used upon changing a gear ratio of the transmission.

BACKGROUND ART

In recent years, electric automobiles each of which drives wheels by an electric motor instead of an internal combustion engine have attracted an increasing interest from the viewpoint of prevention of air pollution and reduction of vehicle noise.

These electric automobiles also include those provided with a transmission so that output rotation from a drive motor is transmitted to drive wheels by selecting a gear position of the transmission and changing the speed of the rotation in accordance with the gear position so selected.

Transmissions of such electric automobiles, like automobiles of the internal combustion type, include manual transmissions whose gear positions are each changed over by a driver's manual operation with disconnection and connection of a clutch, automatic transmissions whose gear positions are each changed over automatically based on a vehicle speed, a motor rotation speed and an accelerator stroke, and semiautomatic transmissions or clutchless transmissions that, although the driver does not perform a clutching operation, a gear ratio is changed over by a manual operation and the transmission is changed over based on this operation under electronic control or the like.

Different from an automobile of the internal combustion type, an electric automobile is not required to perform idling during a stop so that its motor is stopped. An automatic transmission for use in an automobile, which is provided with an internal combustion engine as a drive source, cannot therefore be adopted as is for the electric automobile. Namely, in the case of a hydraulically-driven transmission, for example, an oil pump which produced a hydraulic pressure is normally driven by a drive motor. In an electric automobile, a motor however remains stopped during a stop so that no hydraulic pressure is produced. It is therefore expected that a change-over operation of a transmission may not be performed.

On the other hand, a synchronizer mechanism which is adopted in a manual transmission or a manual transmission equipped with an automatic clutch has low practical utility in an electric automobile due to the high potential problem that a change-over of a gear position may not be feasible.

A transmission different from those employed in automobiles of the internal combustion type is therefore needed.

Further, a large shift shock tends to occur upon completion of a change-over of a gear position of a transmission because of a difference in speed between an output rotation speed of the motor and a wheel speed. It is therefore necessary to make an output rotation speed of the motor appropriate upon shifting.

Various techniques have therefore been proposed, including techniques that feature addition of such rotation speed control to change-over control of a gear position in an automatic transmission or semi-automatic transmission and techniques that permit control of a motor rotation speed even in the case of a manual transmission.

For example, the technique (first technique) of Japanese Patent Publication (Kokoku) No. SHO 52-17300 relates to a clutchless change-over mechanism which upon production of a shift command, changes a transmission once into a neutral position to accelerate or decelerate a motor and, while detecting a rotational speed of an input gear, makes speeds of the motor and the input gear equal to each other, and then brings gears into engagement, whereby a shift shock is reduced.

The technique (second technique) disclosed, for example, in Japanese Patent Application Laid-Open (Kokai) No. SHO 58-176504 is to achieve matching in speed between a motor and an axle by cutting off a supply of electric power to the motor when the motor and the axle are disconnected by an operation of a clutch pedal or a transmission.

However, the first conventional technique develops a delay in time upon performing control in such a way that a rotational speed of an input gear and that of an output gear are detected and the transmission is then controlled to make these speeds become equal to each other. It therefore takes substantial time until their rotational speeds are made equal to each other. Shifting cannot be performed quickly, thereby resulting in a substantial delay of completion of an actual shifting operation relative to the driver's shifting operation. Normally (i.e., at a time other than a shifting time), only output control of a motor (torque control) is conducted in accordance with an accelerator stroke so that control of a torque is only needed as motor control. According to this technique, however, two logics have to be equipped for the control of a motor, one for torque control and the other for rotational speed control.

On the other hand, the second conventional technique requires as a premise that the accelerator stroke is none (in other words, the motor torque is none) when a gear position is changed over. A motor torque is therefore once brought to zero upon changing a gear position and after completion of the change-over of the gear position (i.e., after engagement of gears or connection of a clutch), a motor torque is controlled again so that it corresponds to a degree of depression of an accelerator by a driver (i.e., an accelerator stroke). When a motor torque is once brought to zero as described above, the vehicle speed decreases. Any attempt to promptly control the motor torque according to the accelerator stroke therefore makes the running of the vehicle awkward, thereby making it impossible to perform smooth running at a time of shifting in some instances.

Of course, shifting cannot be performed if the accelerator is kept depressed.

With the foregoing problems in view, the present invention has as an object the provision of a gear shift control method for an electric automobile, which permits a smooth change-over of a gear position even when an accelerator pedal is kept depressed.

DISCLOSURE OF THE INVENTION

In one aspect of the present invention, there is thus provided a gear shift control method for an electric automobile, said automobile being provided with

- an accelerator pedal for commanding an output amount of a drive motor,
- a transmission arranged between said motor and drive wheels and having plural gear ratios, and
- gear shift control means for outputting a gear-position change-over signal in response to a changing operation of a gear position of the transmission by shifting operation means and in accordance with a running condition of a vehicle, comprising the following consecutive steps (i) to (iv): (i) calculating upon output of the change-over signal from the shifting operation means, output control of the motor, which has been controlled in accordance with a stroke amount of the accelerator pedal, and changing said transmission into a neutral position; (ii) controlling after completion of the first step, an output amount of the motor in accordance with a target motor output amount corresponding to a target motor rotation speed, the target motor rotation speed being calculated based on a vehicle speed at a time of the changing operation and a gear ratio of a selected target gear position; (iii) shifting after completion of the second step, the transmission to the target gear position; and (iv) allowing after completion of the third step, an output amount of the motor to gradually return to an output amount corresponding to a stroke amount of the accelerator pedal.

Owing to such features, anticipated control of equalization in rotational speed, for example, between an input gear and an output gear can shorten the control time for the equalization and can hence achieve a change-over of a gear position with good response to a shifting operation. Further, even when a gear position is changed over while the accelerator pedal is kept depressed, the shifting can be performed smoothly and promptly without inducing a shift shock and in addition, a smooth and prompt return to the output control of the motor in accordance with an accelerator stroke becomes feasible.

In the first step, the output amount of the motor may be gradually reduced to zero when the gear-position change-over signal from the shifting operation means is an upshift signal.

This feature can efficiently decrease a motor rotation speed upon movement to a neutral position. The motor rotation speed can, therefore be brought beforehand close to a target motor rotation speed for a period after the change-over of the gear position. It is, therefore, possible to smoothly move to an upshift operation while avoiding induction of a shift shock, thereby facilitating a smooth and prompt upshift.

In the first step, the output amount of said motor may be held when the gear-position change-over signal from the shifting operation means is an downshift signal.

This feature can efficiently increase a motor rotation speed upon movement to the neutral position. The motor speed can, therefore, be brought beforehand close to a target motor rotation speed for a period after the change-over of the gear position. It is, therefore, possible to smoothly move to a downshift operation while avoiding induction of a shift shock, thereby facilitating a smooth and prompt downshift.

Further, the first step may be completed when a preset first predetermined time has elapsed or a rotation speed of the motor has changed by at least a predetermined value.

Owing to this feature, a smooth and prompt downshift can be facilitate while suppressing racing in motor rotation speed. Further, an acceleration or deceleration of the motor can be performed surely and promptly. In this sense, it is also possible to perform a downshift promptly and also to perform the gear shift control itself in a simple manner.

An output amount in a reverse direction may be set as the target motor output amount in said second step when the gear-position change-over signal from the shifting operation means is an upshift signal.

This feature, by the positive suppression of rotation of the motor, can promptly achieve equalization in rotational speed through a reduction in the motor rotation speed, the equalization being required upon performing an upshift, thereby making it possible to perform a prompt and smooth upshift.

The second and third steps may be completed when a preset second predetermined time and a preset third predetermined time have elapsed respectively; and in the second step, the output amount of the motor may be set by adding a correction value to a preceding output amount of the motor, said correction value being obtained by multiplying, with an inertia torque constant corresponding to a rotation system of the motor, a first value obtained by dividing with a sum of the second predetermined time and the third predetermined time, a value which is obtained by subtracting from the target motor rotation speed an actual motor rotation speed at a time of the move to the second step.

Owing to these features, control of a motor output amount in accordance with an inertia of the rotation system of the motor can apparently reduce a variation in the torque due to rotational inertia energy of the rotation system of the motor to none, thereby achieving a prompt change-over of a gear position while reducing a shift shock.

Further, the third step may be completed when a preset third predetermined time has elapsed or a difference between an actual motor rotation speed and the target motor rotation speed has become equal to or smaller than a predetermined value.

Owing to such a feature, move to motor output control in accordance with the accelerator stroke can be promptly and smoothly performed.

In the fourth step, the output amount of the motor may be allowed to return to the output amount corresponding to the stroke amount of the accelerator pedal over a fourth predetermined time which is set longer as the stroke amount of the accelerator pedal becomes greater.

Owing to such a feature, move to motor output control in accordance with the accelerator stroke can be promptly and smoothly performed.

The gear shift control means may be provided at least with gear position memory means defining each gear position in accordance with running conditions of the vehicle, the running conditions including at least the stroke amount of the accelerator pedal and the vehicle speed; and the gear-position change-over signal may be outputted from the gear position memory means in accordance with the running conditions of said vehicle.

Owing to such features, a change-over of a gear position can be performed appropriately and surely.

BRIEF DESCRIPTION OF THE DRAWINGS

FIG. 2 is a schematic diagram showing elements of the electric automobile, said elements being associated with the gear shift control method according to the one embodiment of the present invention for the electric automobile;

FIG. 8(A) to FIG. 8(D) are time charts showing a specific example of the control of an upshift in the gear shift control method according to the one embodiment of the present invention for the electric automobile, in which FIG. 8(A) shows the control in relation to a shift signal, FIG. 8(B) illustrates the control in relation to a motor output, FIG. 8(C) depicts the control in relation to a motor rotation speed, and FIG. 8(D) illustrates the control in relation to a solenoid valve (directional control valve) for changing the gear position;

FIG. 9(A) to FIG. 9(D) are time charts showing a specific example of the control of a downshift in the gear shift control method according to the one embodiment of the present invention for the electric automobile, in which FIG. 9(A) shows the control in relation to a shift signal, FIG. 9(B) illustrates the control in relation to a motor output, FIG. 9(C) depicts the control in relation to a motor rotation speed, and FIG. 9(D) illustrates the control in relation to a solenoid valve (directional control valve) for changing the gear position;

BEST MODE FOR CARRYING OUT THE INVENTION

Figure 1:
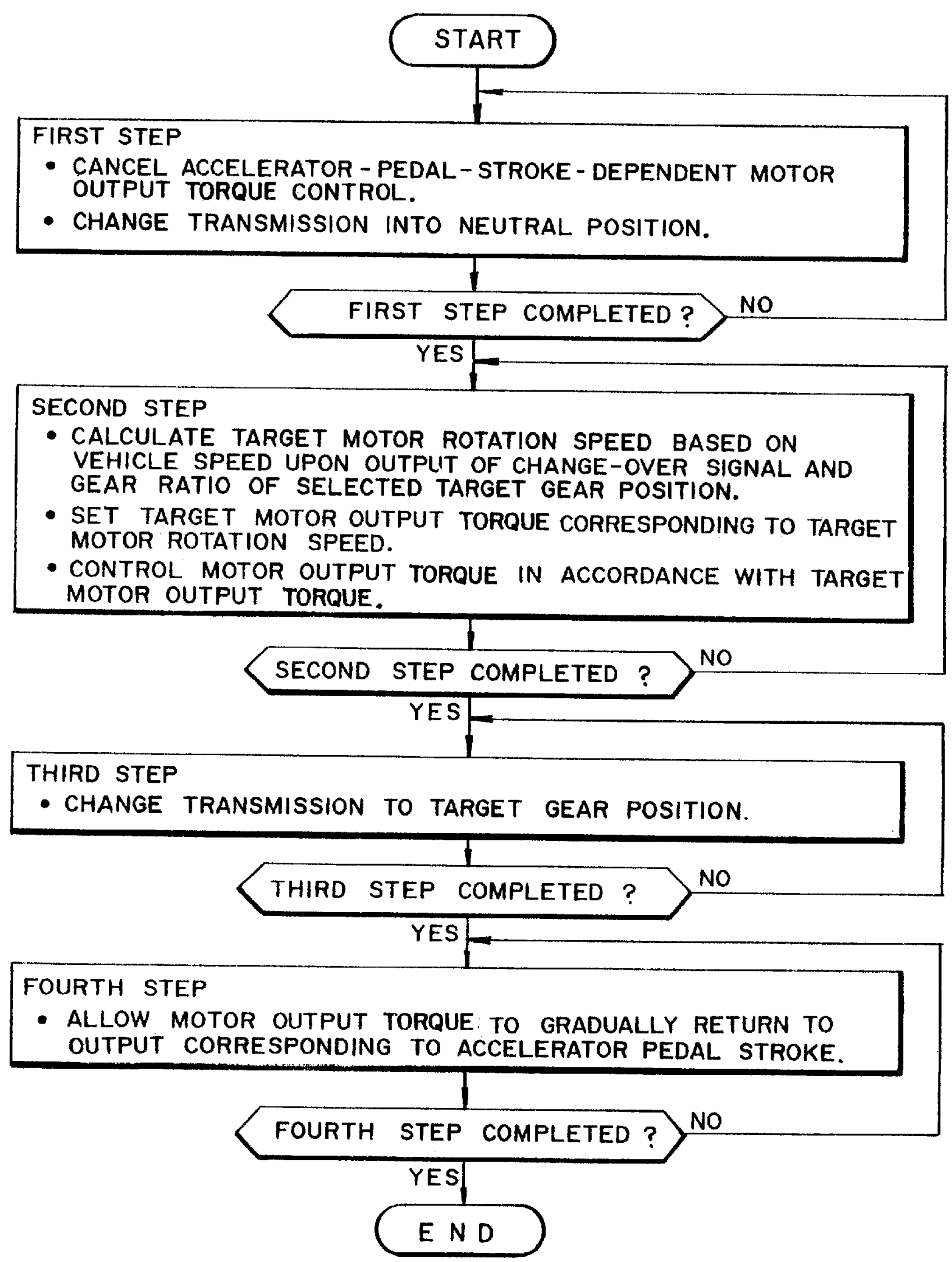
FIG. 1 is a flow chart illustrating an outline of a gear shift control method according to one embodiment of the present invention for an electric automobile.

With reference to FIG. 1 to FIG. 11, a description will hereinafter be made about the embodiment of the present invention.

FIG. 2 is the schematic diagram showing the elements of the electric automobile, which are associated with the one embodiment of the present invention. In FIG. 2, designated at numeral 1 is a drive battery while indicated at numeral 2 is a drive motor operated by electric power from the battery 1. Drive wheels 3 are driven by the motor 2. The motor 2 is normally controlled by a motor controller 5 so that an output torque corresponding to a stroke of an accelerator pedal 4 is obtained.

Further, a transmission 6 is arranged between the motor 2 and the drive wheels 3, whereby a rotational speed of the motor 2 is shifted at the transmission 6 and is then transmitted to the drive wheels 3. In this embodiment, a two-speed transmission having a first speed (1ST or low (L)) and a second speed (2ND or high (H)) is used as the transmission 6. This transmission 6 is normally changed over by an operation of a shift lever 7 as shifting operation means.

Accordingly, there are also arranged a shift position switch 8 for detecting a selected position, namely, a shift position of the shift lever 7 and a shift controller 9 (gear shift control means) for moving necessary portions of the transmission 6 on the basis of information from the shift position switch 8 to achieve a gear position corresponding to the selected position of the shift lever 7. Incidentally, numeral 2A indicates a rotational speed sensor for detecting a rotational speed of the motor and numeral 10 designates, as vehicle speed detection means, a rotational speed sensor for an output shaft of the transmission.

It is to be noted that the present gear shift control method for the electric automobile can be applied not only to a manual transmission as that shown in FIG. 2 but also to an automatic transmission which automatically perform a change-over of a gear position in accordance with an operation condition of an engine. In such a case, it is possible to store a shift map such as that shown, for example, in FIG. 10 in an unillustrated gear position memory means in the shift controller 9 and to set a gear position on the basis of the map. Described specifically, the shift controller 9 is internally provided with functions (gear-position change-over signal generation means) which, if a current gear position is a 1st speed upon receipt of detection information about a vehicle speed and an accelerator stroke (engine load), outputs an upshift command (gear-position change-over signal) from the 1st speed to a 2nd speed when an operation condition changes to rightwardly cross a 1→2 upshift line shown by a solid line in the map of FIG. 10 but which, if a current gear position is the second speed upon receipt of such detection information, outputs a downshift command (gear-position change-over signal) from the 2nd speed to the 1st speed when an operation condition changes to leftwardly cross a 2→1 upshift line shown by a broken line in the map of FIG. 10. Therefore the gear position change-over control can be performed appropriately and surely. At the transmission, brakes, clutches or the like are operated as needed in accordance with the downshift command signal to achieve a desired gear position.

Figure 3:
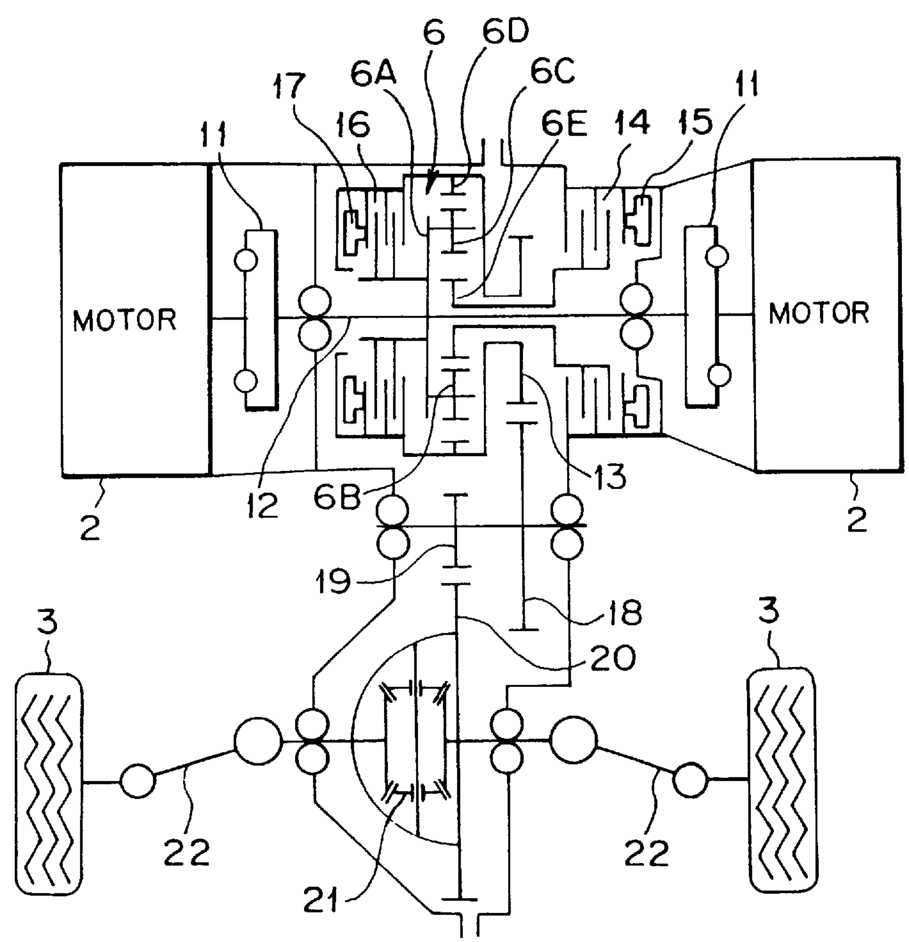
FIG. 3 is a skeleton diagram depicting a transmission associated with the gear shift control method according to the one embodiment of the present invention for the electric automobile.

Further, the transmission and a drive force transmission system around the transmission 6 are constructed, for example, as illustrated in FIG. 3. Namely, respective output shafts of motors 2,2 are connected to an input shaft 12 of the transmission 6 via a flexible coupling 11.

As the transmission 6, a transmission of the double-pinion planetary gear type is used. The transmission 6 comprises a carrier 6A connected to the input shaft 12 for integral rotation, inner and outer planetary pinions 6B,6C rotatably supported on the carrier 6A, a ring gear 6D connected to an output gear 13 for integral rotation, and a sun gear 6E connected to a 1st-speed brake 14.

When pressed by a piston 15, the 1st-speed brake 14 fixedly holds the sun gear 6E so that a rotational speed of the ring gear 6D is made lower than that of the carrier 6A. In addition, a 2nd-speed clutch 16 is arranged between the carrier 6A and the ring gear 6D. When pressed by a piston 17, this 2nd-speed clutch 16 causes the carrier 6A and ring gear 6D to rotate together.

Although a drive system for the respective pistons 15,17 will be described subsequently herein, it is to be noted that these pistons 15,17 are not concurrently operated to exert pressure but are designed to take one of three modes, that is, a 1st-speed mode in which only the piston 15 is operated to exert pressure so that the 1st-speed brake is brought into engagement, a 2nd-speed mode in which only the piston 17 is operated to exert pressure so that the 2nd-speed clutch 16 is connected, and a neutral mode in which neither the piston 15 nor the piston 17 is operated so that the input shaft 12 brought into an idling condition.

When one of the pistons 15,17 is operated and the output gear 13 is driven under the 1-speed or 2nd-speed gear conditions, its torque is transmitted via gears 18,19,20 to a differential 21, from which the torque is distributed to left and right driven axles 22,22 to drive the drive wheels 3,3 (see FIG. 2).

Figure 4:
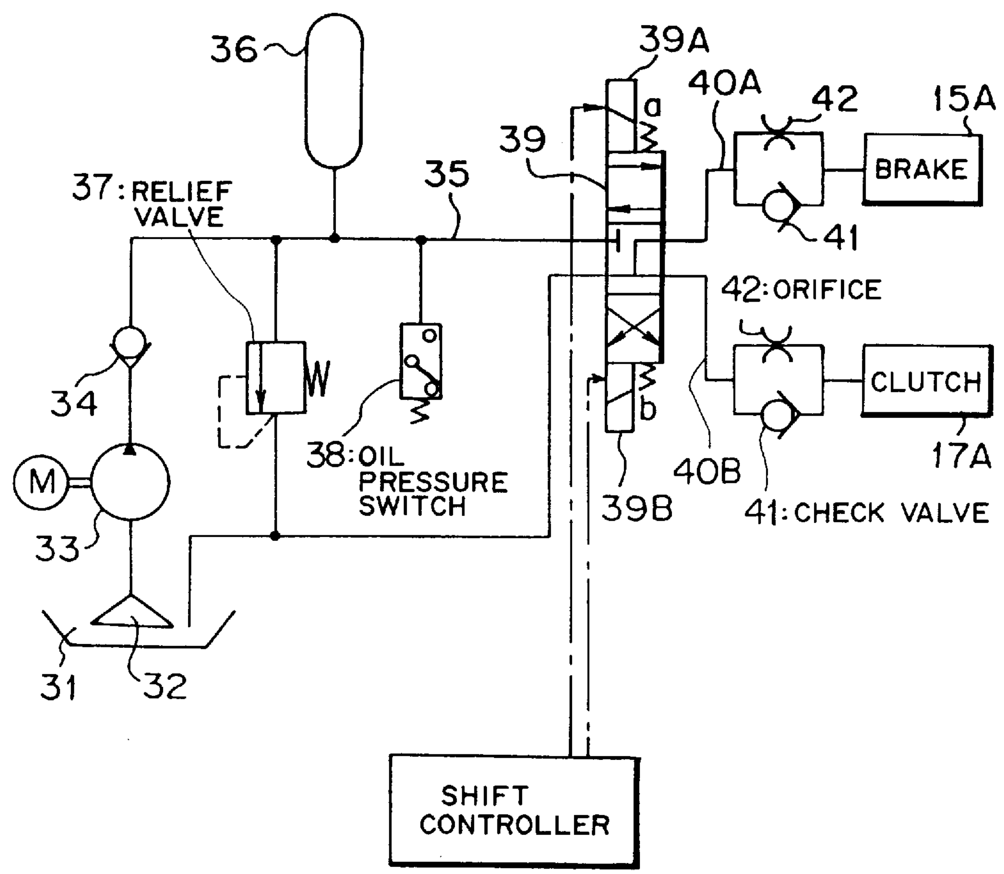
FIG. 4 is a circuit diagram illustrating a hydraulic pressure system for performing control of a change-over of the transmission associated with the gear shift control method according to the one embodiment of the present invention for the electric automobile.

The drive system for the individual pistons 15,17 is constructed as shown in FIG. 4. In FIG. 4, there are illustrated a working oil reservoir 31, a filter 32, a motor-driven pump 33, a check valve 34, an oil line 35, an accumulator 36, a relief valve 37, an oil pressure switch 38, and a solenoid valve 39. Also shown are an oil line 40A for supplying working oil to an oil compartment 15A of the piston 15 for the 1st-speed brake, 14 an oil line 40B for supplying working oil to an oil compartment 17A of the piston 17 for the 2nd-speed clutch, 16 check valves 41, and orifices 42.

The working oil inside the working oil reservoir 31 is driven by the motor-driven pump 33 and is accumulated in the accumulator 36. The pressure of the working oil inside the accumulator 36 is controlled to or below a preset limit pressure by the relief valve 37.

The solenoid valve 39 is a directional control valve and takes a mode (1st-speed mode) in which the working oil is supplied to the oil compartment 15A for the 1st-speed brake, 14 a mode (2nd-speed mode) in which the working oil is supplied to the oil compartment 17A for the 2nd-speed clutch, 16 and a mode (neutral mode) in which the working oil is not supplied to any one of the oil compartments 15A. The solenoid valve 39 takes the 1st-speed mode when a solenoid 39A is energized but assumes the 2nd-speed mode when a solenoid 39B is energized, but takes the neutral mode when neither solenoid 39A nor the solenoid 39B is energized.

The shift controller 9 controls a supply of electric power to these solenoids 39A,39B so that the transmission 6 is controlled in one of the 1-speed mode, the 2nd-speed mode or the neutral mode.

Incidentally, the shift controller 9 is also provided with a reverse mode but the transmission itself is not provided with reverse gears. When this reverse mode is set, the transmission 6 is set in the 1st-speed position, and control is performed via the motor controller 5 to reverse the motor 2.

Here, with respect to the gear shift control method which is performed through the shift controller 9, its outline will first be described with reference to FIG. 1.

Needless to say, this gear shift control is started when a shifting operation (a change-over operation of a gear position) is performed through the shift lever 7 in the case of a manual transmission, but in the case of an automatic transmission, is started when an operation condition changes to cross the upshift line or downshift line in the shift map (FIG. 10) and a gear-position change-over signal is outputted.

The present gear shift control method comprises four steps (step 1 to step 4).

In step 1, when a shifting operation of a gear position takes place or an output of a gear-position change-over signal is generated, output control of the motor 2, which has been performed depending on an stroke of the accelerator pedal 4 until that time, is canceled, and the transmission 6 is changed into the neutral position. Even if the accelerator pedal 4 is operated, the above cancellation makes it possible to perform the output control of the motor 2 irrelevant to the operation of the accelerator pedal. Further, the setting of the transmission 6 in the neutral position makes it easier to freely perform the output control of the motor 2. Consequently, step 1 performs the output control of the motor 2 to equalize a rotational speed of an output of the transmission after shifting with a rotational speed of a running wheel.

In step 1, the transmission 6 is brought into the neutral position, for example, by disconnecting the clutch. This disconnection of the clutch however requires a predetermined time, because so-called dragging of the clutch takes place until the piston fully retreats in the clutch. Upon elimination of this dragging of the clutch, step 1 is completed.

Specifically, determination of the completion of step 1 is performed as will be described hereinafter.

As the dragging of the clutch is eliminated when oil is released from the piston of the clutch, a first predetermined time is set as an anticipated time which is required until the oil is released from the piston of the clutch. As soon as step 1 reaches the first predetermined time, the dragging of the clutch is taken as having eliminated and step 1 is completed.

When the dragging of the clutch is eliminated, the clutch is no longer engaged so that effects of the output control of the motor 2 become greater and the motor rotation speed undergoes a greater change. When a large change takes place in the motor rotation speed, the dragging of the clutch can be estimated to have been eliminated even if the first predetermined time has not elapsed. Step 1 is also considered to have completed in this case.

After completion of step 1, step 2 is performed.

In step 2, a target motor rotation speed is calculated based on a vehicle speed at the time of a shifting operation as detected by the rotational speed sensor 10 and the gear ratio of a target gear position selected by the shift lever 7. Further, a target motor output amount corresponding to this target motor rotation speed is calculated, and in accordance with this target motor output amount, an output amount of the motor 2 is controlled through the motor controller 5. In step 2, the transmission is completely neutral so that a motor rotation speed can be controlled with a desired speed change, for example, by setting a target motor output amount while taking inertia of the motor and a rotation system, interlocked with the motor, into consideration.

Step 2 is designed to be completed when a preset second predetermined time has elapsed. After completion of step 2, step 3 is performed.

In step 3, the transmission 6 is changed to the target gear ratio. Further, at this time, the output control of the motor 2, which is performed in accordance with the target motor output amount, is continued as in step 2. Step 3 is also designed to be completed when a preset third predetermined time has elapsed.

Since the output control of the motor 2 is performed in step 2 and step 3 as described above, the output control of the motor 2 is conducted for a time as long as the second predetermined time plus the third predetermined time. The motor rotation speed increases or decreases with a constant speed change under this control, so that at the stage of setting of a target motor output amount, a time at which the motor rotation speed will reach the target motor speed can be calculated. The time of the second predetermined time plus the third predetermined time is set at a time until the motor rotation speed reaches the target motor rotation speed since the target motor output control is started as described above.

Step 3 is completed upon completion of the shifting of the transmission 6 to the target gear position. This shifting to the target gear position is performed, for example, by connecting the clutch. This connection of the clutch also takes a predetermined time. In this embodiment, step 3 is completed awaiting an elapse of an anticipated time which will be required for the connection of the clutch.

Accordingly, the third predetermined time is set at a time preset as an anticipated time for the connection of the clutch.

The above-described second predetermined time is obtained by subtracting the third predetermined time from the time required until the target motor rotation speed is reached (the second predetermined time plus the third predetermined time).

After completion of step 3, step 4 is then performed.

In step 4, the output of the motor 2 is allowed to gradually return to an output amount corresponding to a stroke of the accelerator pedal 4. Step 4 is also designed to be completed when a preset fourth predetermined time has elapsed. The fourth predetermined time required for step 4 is set corresponding to an accelerator stroke. Namely, if the accelerator stroke is large, the fourth predetermined time is set longer so that a return to an output amount corresponding to the stroke of the accelerator pedal 4 is not performed abruptly. If the accelerator stroke is small, on the other hand, the fourth predetermined time can be set shorter because a return to an output amount corresponding to the stroke of the accelerator pedal 4 is promptly completed even if this return is not performed abruptly.

As the specific construction of each of such steps differs depending on whether the shifting is an upshift or a downshift, details of each step will be described by separating shifting into an upshift and a downshift.

As the transmission is a two-speed transmission in this embodiment, a shifting operation of the gear ratio is performed in one of two ways, in other words, as an upshift from the 1st speed to the 2nd speed or as a downshift from the 2nd speed to the 1st speed.

Figure 5:
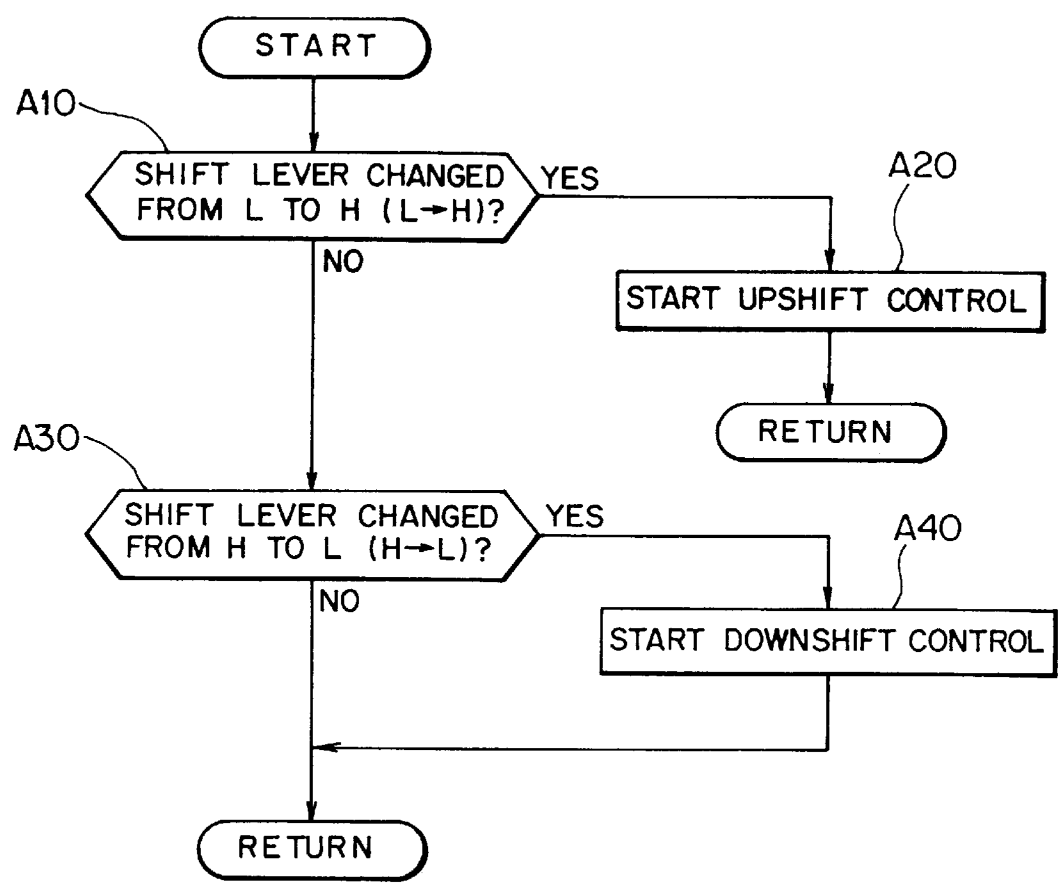
FIG. 5 is a flow chart showing control of a start of the gear shift control method according to the one embodiment of the present invention for the electric automobile.

Accordingly, in the case of manual shifting, a start of gear shift control can be controlled, for example, as shown in the flow chart of FIG. 5. Described specifically, while periodically monitoring, for example, the position of the shift lever 7, it is determined based on a change-over signal from the shift lever 7 whether an upshift command from the 1st speed (L) to the 2nd speed (H) has been outputted (step A10). If there is the upshift command, a start of the upshift control is commanded (step A20). If there is no upshift command, it is determined whether a downshift command from the 2nd speed (H) to the 1st speed (L) has been outputted (step A30). If there is the downshift command, a start of the downshift control is commanded (step A40). If there are neither shift commands, the next control cycle is awaited.

Figure 11:
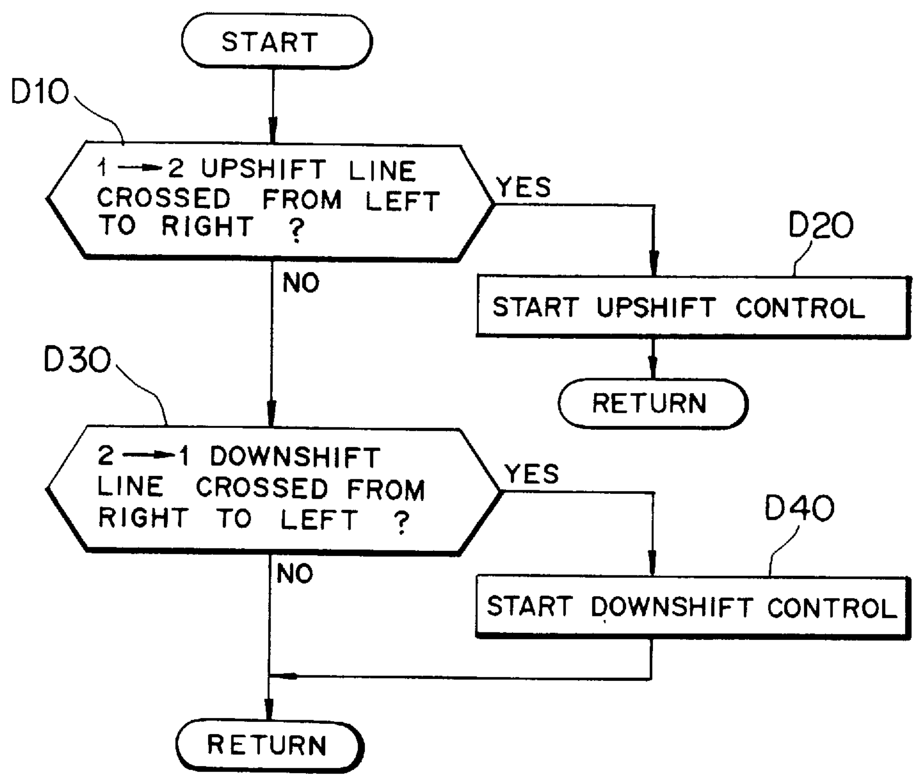
FIG. 11 is a flow chart illustrating a control operation of the automatic transmission associated with gear shift control method according to the one embodiment of the present invention for the electric automobile.

In the case of automatic shifting, a start of gear shift control can be controlled likewise as illustrated in the flow chart of FIG. 11. Described specifically, while periodically monitoring a relationship between an accelerator stroke and a vehicle speed, it is determined whether the relationship between the accelerator stroke and the vehicle speed has changed to cross the 1→2 upshift line from the left side to the right side in the map of FIG. 10 (step D1O). If the relationship is determined to have crossed the upshift line from the left side to the right side, an upshift command signal from the 1st speed to the 2nd speed is outputted to start the upshift control (step D20). If the relationship is not determined to have crossed the upshift line from the left side to the right side, it is then determined whether the relationship between the accelerator stroke and the vehicle speed has changed to cross the 2→1 downshift line from the right side to the left side in the map of FIG. 10 (step D30). If the relationship is determined to have crossed the downshift line from the right side to the left side, a downshift command signal from the 2nd speed to the 1st speed is outputted to start the downshift control (step D40). If neither shift lines are crossed, the next control cycle is awaited.

Figure 6:
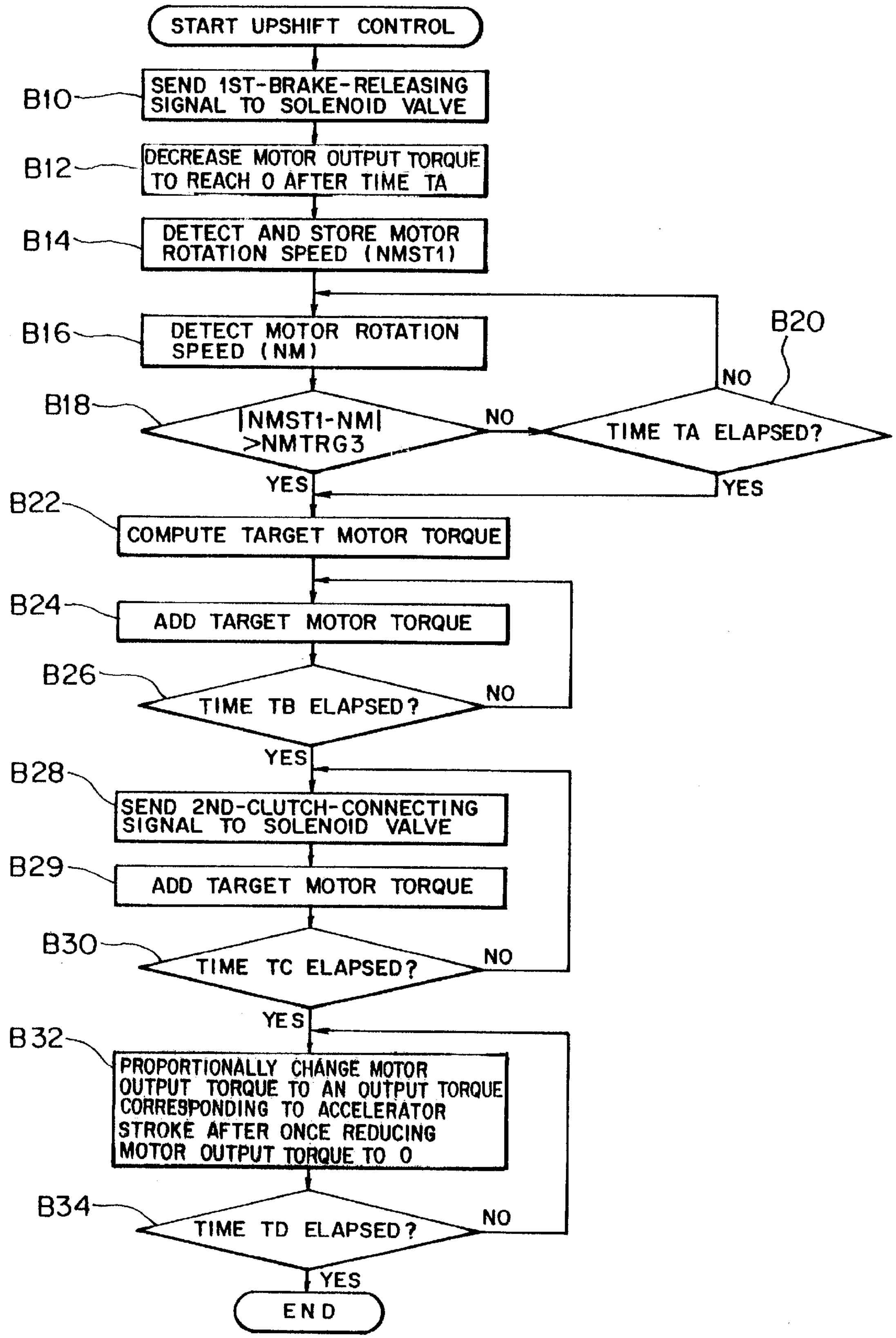
FIG. 6 is a flow chart illustrating control of an upshift in the gear shift control method according to the one embodiment of the present invention for the electric automobile.

When a start of the upshift control is commanded, processings are performed as shown in the flow chart of FIG. 6 so that output control of the motor 2 and control of a change-over of the transmission via the directional control valve are performed, for example, as shown in FIG. 8(A) to FIG. 8(D).

Incidentally, steps B10–B18 and B20 in FIG. 6 correspond to step 1, steps B22–B26 to step 2, steps B28–B30 to step 3, and steps B32–B34 to step 4, respectively.

In this upshift control, a signal is first outputted to the solenoid valve (directional control valve) 39 to the effect that the 1st-speed brake be released to bring the transmission into the neutral position (step B10), and a torque of the motor 2 is controlled so that the torque will be reduced to 0 after a time TA (the first predetermined time) (step B12). Further, a motor rotation speed NM which was detected by the rotational speed sensor 2A at the start of the control (at the time of the output of the upshift command) is fetched and stored as an initial rotational speed (NMST1) (step B14). After that, each motor rotation speed NM detected at a constant cycle by the rotational speed sensor 2A is fetched in step 1.

At the next cycle, a motor rotation speed NM is fetched (step B16), and the routine then advances to step B18, where a comparison is made to determine if the difference (=|NMST1−NM|) between the latest motor rotation speed NM and the initial rotation speed NMST1 has exceeded a preset predetermined value NMTRG3. If the difference (|NMST1−NM|) is not determined to have exceeded the predetermined value NMTRG3, the routine then advances to step B20, where it is determined whether the time TA (the first predetermined time) has elapsed since the start of the first step. If the time TA is not determined to have elapsed, a motor rotation speed NM is again fetched at the next data fetching cycle (step B16), and the processings of step B18 and step B20 are repeated.

If dragging of the 1-speed brake is promptly eliminated, the motor rotation speed NM undergoes a faster change before an elapse of the time TA so that the difference (|NMST1−NM|) exceeds the predetermined value NMTRG3. At this time point, the routine therefore advances to step B22 in step 2. Even if a substantial time is taken for the elimination of the dragging of the 1-speed brake, this dragging can be anticipated to have eliminated after an elapse of the time TA. After an elapse of the time TA, the routine therefore advances to step B22 in step 2.

In step 2, a target motor torque (target motor output amount) is first computed (step B22).

For this computation, a target motor rotation speed NMSP is first determined. Based on this target motor rotation speed NMSP, a target motor torque (target motor output amount) MOUTSP is computed.

The target motor rotation speed NMSP can be calculated using the following formula (1):

$$NMSP = NOSP \times \text{gear ratio} \quad (1)$$

where NOSP means a vehicle speed at the time of a change-over of the shift lever, and the gear ratio in this case is that of the 2nd speed (H range) as the target gear position to be shifted to.

On the other hand, the target motor torque (target motor output amount) MOUTSP can be calculated using the following formula (2):

$$MOUTSP = TACC \times (NMSP - NMST2)/(TB + TC) \quad (2)$$

where TACC means an inertia torque constant of the rotation system of the motor and a first shaft rotation system of the transmission (speed-change gears), NMSP the above-described target motor rotation speed, NMST2 a motor rotation speed upon movement to step 2, TB a processing time (the second predetermined time) of step 2, and TC a processing time (the third predetermined time) of step 3.

After the target motor torque (target motor output amount) MOUTSP has been obtained as described above, the torque of the motor 2 is controlled to this target motor torque MOUTSP (step B24). As a result, a reverse torque as much as a rotation inertia torque is applied to the motor 2 so that the rotational speed of the motor 2 is promptly reduced to such a level as not exerting a large shock to the vehicle.

Then, while monitoring an elapse of the time TB (step B26), the torque of the motor 2 is allowed to remain at the target value MOUTSP during the time TB.

After the time TB has elapsed, the routine advances to step B28 in step 3.

In step 3, the transmission 6 is changed to the target gear position as described above. Specifically, this is performed by outputting a signal to the solenoid valve (directional control valve) 39 to the effect that the 2nd-speed clutch be connected (step B28). At this time, the motor torque is held at the target motor torque MOUTSP (step B29).

When the motor torque is held at the target motor torque MOUTSP as long as the time (TB+TC), the motor rotation speed is theoretically supposed to become the target motor rotation speed. Although the motor rotation speed is not always brought into full conformity with the target motor rotation speed in practice due to various errors and the like, the motor rotation speed takes a value extremely close to the target motor rotation speed.

An elapse of the time TC is monitored (step B30). After the time TC has elapsed, the routine advances to step B32 in step 4.

In step 4, the output torque of the motor 2 is first reduced to 0 and is then allowed to gradually return (increase) (linearly) from the state of 0 output torque to an output torque corresponding to a stroke of the accelerator pedal 4.

Step 4 is continued for the time TD (the fourth predetermined time). This time TD is set corresponding to the degree of an operation of the accelerator pedal 4 (i.e., the accelerator stroke) at the start of step 4, namely, at a long time if the accelerator stroke is large but at a short time if the accelerator stroke is small. Accordingly, the output torque of the motor 2 returns to an output torque corresponding to the accelerator stroke after an elapse of the time TD, even if the increment of the output torque of the motor 2 is set constant irrespective the accelerator stroke.

This setting of the time TD may be conducted in such a way that the accelerator stroke and TD are brought into a completely proportional relationship by calculating TD, for example, based on multiplication of the accelerator stroke with a coefficient. In this embodiment, however, the accelerator stroke is divided into three sections of small, medium and large, whereby the time TD is set at three levels in such a way that the time TD is set at a time T1 when the accelerator stroke is small, at a time T2 when the accelerator stroke is medium, and at a time T3 when the accelerator stroke is large (T1<T2<T3). Of course, this stepwise setting of TD is not limited to the above and can be set at two level or at four or more levels.

Then, an elapse of the time TD is monitored (step B34). After the time TD has elapsed, this control is ended.

Individual changes of the shift signal, the motor output torque, the motor rotation speed and the directional control valve by such upshift control can be illustrated, for example, as shown in FIG. 8(A) to FIG. 8(D). Incidentally, in each of FIG. 8(A) to FIG. 8(D), period A corresponds to step 1, period B to step 2, period C to step 3, and period D to step 4, respectively.

When the shift signal is changed from the L range to the H range, as illustrated in the diagram, the output torque of the motor 2 is controlled so that it is linearly reduced to 0 after within the time TA (the first predetermined time). Further, the directional control valve 39 is changed from the 1st speed position (1st) to the neutral position (EXT). As a result, the motor rotation speed gradually drops. Further, the actual clutch 14 (the first brake) undergoes a response delay relative to a change-over of the directional control valve 39 to the neutral position, so that the clutch remains in a dragged state for a while.

As the dragging of the clutch in period A, i.e., step 1 is eliminated after an elapse of the first predetermined time (TA) or even before this elapse, if the motor rotation speed is sufficiently reduced, period A is ended at this time point and the control then enters period B, i.e., step 2, where the output torque of the motor 2 is controlled to the above-mentioned target output torque MOUTSP. After that, the output torque of the motor 2 is held at the target output torque MOUTSP during period B and period C, that is, during step 2 and step 3. As a result, the rotation speed of the motor 2 is promptly reduced to a level such that no large shock is exerted to the vehicle.

When the time TB has elapsed after the entrance to period B, namely, step 2, the control enters period C, namely, step 3, where the directional control valve 39 is changed into the 2nd-speed (2nd) position. After this change-over to the 2nd-speed (2nd) position, it takes time until the clutch (the second clutch) 16 is connected. Thus, the time TC or so is required for the connection of this clutch.

When the clutch is fully connected at the time point of an elapse of the third predetermined time (the time TC), the rotational speed of the motor 2 has already been reduced substantially to the target value. Upon connection of the 2nd-speed clutch 16, the rotational speed at the input side and that at the output side have already been equalized. The upshift to the second speed is therefore completed without exertion of a shift shock.

The control then enters period D, namely, step 4, where the motor output torque is first reduced to 0 and is then allowed to linearly increase to a motor output torque corresponding to an accelerator stroke. This period D is performed for the time TD (the fourth predetermined time). Because this time varies depending on the accelerator stroke, a linear increase of the motor output torque at a preset rate leads to a motor output corresponding to the accelerator stroke at the end of period D.

When the gear shift control is ended here and the motor output torque is allowed to return to a motor output torque corresponding to an accelerator stroke, the output control of the motor 2 in accordance with the accelerator stroke can be smoothly continued.

By completing the upshift control through periods A to D (namely, step 1 to step 4), as described above, shifting can be smoothly performed without induction of a shift shock and further, by the reverse control of the motor, the equalization of the rotational speeds can be promptly achieved after the shifting. Incidentally, the processings in these periods A to D can be completed in a sufficiently short time, for example, within 1.5 seconds or less.

Further, even if the accelerator pedal is depressed in each of periods A, B and C, the resulting accelerator stroke remains irrelevant to the control and does not prevent the equalization of the rotational speeds. Accordingly, even if a driver performs, for example, an upshift operation with the accelerator pedal kept depressed, the upshifting can be performed smoothly and promptly without induction of a shift shock and moreover, the control is allowed to smoothly and promptly return to the output control of the motor 2 in accordance with an accelerator stroke.

Figure 7:
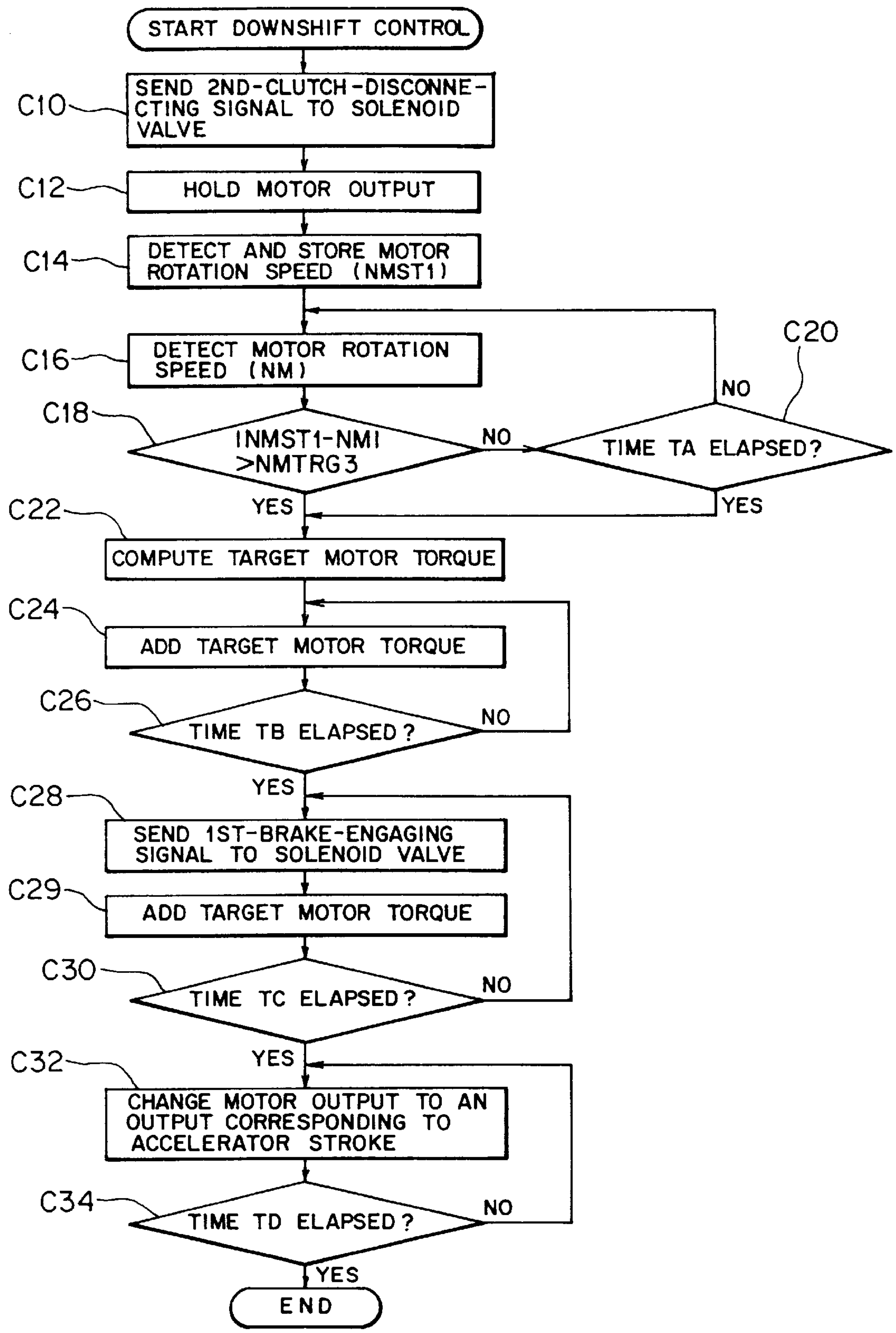
FIG. 7 is a flow chart illustrating control of a downshift in the gear shift control method according to the one embodiment of the present invention for the electric automobile.
Figure 10:
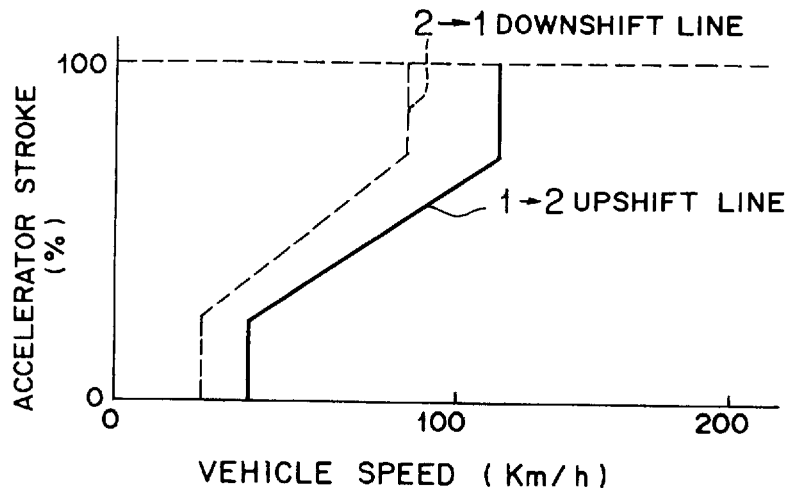
FIG. 10 is a diagram showing a shift map for the illustration of an automatic transmission associated with gear shift control method according to the one embodiment of the present invention for the electric automobile.

When a start of the downshift control is commanded, on the other hand, processings are performed as shown in the flow chart of FIG. 7 so that output control of the motor 2 and control of a change-over of the transmission via the directional control valve are performed, for example, as shown in FIG. 9(A) to FIG. 9(D).

Incidentally, steps C10–C18 and C20 in FIG. 7 correspond to step 1, steps C22–C26 to step 2, steps C28–C30 to step 3, and steps C32–C34 to step 4, respectively.

In this downshift control, a signal is first outputted to the solenoid valve (directional control valve) 39 to the effect that the 2nd-speed clutch be disconnected to bring the transmission into the neutral position (step C10), and a torque of the motor 2 is held (step C12). Further, a motor rotation speed NM which was detected by the rotational speed sensor 2A at the start of the control (at the time of the output of the downshift command) is fetched and stored as an initial rotational speed (NMST1) (step C14). After that, each motor rotation speed NM detected at a constant cycle by the rotational speed sensor 2A is fetched in step 1.

At the next cycle, a motor rotation speed NM is fetched (step C16), and the routine then advances to step C18, where as in the upshift, a comparison is made to determine if the difference (=|NMST1−NM|) between the latest motor rotation speed NM and the initial rotation speed NMST1 has exceeded a preset predetermined value NMTRG3. If the difference (|NMST1−NM|) is not determined to have exceeded the predetermined value NMTRG3, the routine then advances to step C20, where it is determined whether the time TA (the first predetermined time) has elapsed since the start of the first step. If the time TA is not determined to have elapsed, a motor rotation speed NM is again fetched at the next data fetching cycle (step C16), and the processings of step C18 and step C20 are repeated.

If dragging of the 2nd-speed clutch is promptly eliminated, the motor rotation speed NM undergoes a faster change before an elapse of the time TA so that the difference (|NMST1−NM|) exceeds the predetermined value NMTRG3. At this time point, the routine therefore advances to step C22 in step 2. Even if a substantial time is taken for the elimination of the dragging of the 2nd-speed clutch, this dragging can be anticipated to have eliminated after an elapse of the time TA. After an elapse of the time TA, the routine therefore advances to step C22 in step 2.

In step 2, a target motor torque (target motor output amount) is first computed (step C22).

For this computation, a target motor rotation speed NMSP is first determined. Based on this target motor rotation speed NMSP, a target motor torque (target motor output amount) MOUTSP is computed.

The target motor rotation speed NMSP can be calculated using the following formula (3):

$$NMSP=NOSP\times\text{gear ratio} \quad (3)$$

where NOSP means a vehicle speed at the time of a change-over of the shift lever, and the gear ratio in this case is that of the 1st speed (L range) as the target gear position to be shifted to.

On the other hand, the target motor torque (target motor output amount) MOUTSP can be calculated using the following formula (4):

$$MOUTSP=TACC\times(NMST2-NMSP)/(TB+TC) \quad (4)$$

where TACC means an inertia torque constant of the rotation system of the motor and a first shaft rotation system of the transmission (speed-change gears), NMSP the above-described target motor rotation speed, NMST2 a motor rotation speed upon movement to step 2, TB a processing time (the second predetermined time) of step 2, and TC a processing time (the third predetermined time) of step 3.

After the target motor torque (target motor output amount) MOUTSP has been obtained as described above, the torque of the motor 2 is controlled to this target motor torque MOUTSP (step C24). As a result, a normal rotation torque as much as a rotation inertia torque is applied to the motor 2 so that the rotational speed of the motor 2 is promptly increased to such a level as not exerting a large shock to the vehicle.

Then, while monitoring an elapse of the time TB (step C26), the torque of the motor 2 is allowed to remain at the target value MOUTSP during the time TB.

After the time TB has elapsed, the routine advances to step C28 in step 3.

In step 3, the transmission 6 is changed to the target gear position as described above. Specifically, this is performed by outputting a signal to the solenoid valve (directional control valve) 39 to the effect that the 1st-speed brake be engaged (step C28). At this time, the motor torque is held at the target motor torque MOUTSP (step C29).

When the motor torque is held at the target motor torque MOUTSP as long as the time (TB+TC), the motor rotation speed is theoretically supposed to become the target motor rotation speed. Although the motor rotation speed is not always brought into full conformity with the target motor rotation speed in practice due to various errors and the like, the motor rotation speed takes a value extremely close to the target motor rotation speed.

An elapse of the time TC is monitored (step C30). After the time TC has elapsed, the routine advances to step C32 in step 4.

In step 4, the output torque of the motor 2 is controlled to gradually return linearly (decrease) to an output corresponding to a stroke of the accelerator pedal 4.

Step 4 is continued for the time TD (the fourth predetermined time). This time TD is set corresponding to the degree of an operation of the accelerator pedal 4 (i.e., the accelerator stroke) at the start of step 4, namely, at a long time if the accelerator stroke is large but at a short time if the accelerator stroke is small. Accordingly, the output torque of the motor 2 returns to an output corresponding to the accelerator stroke after an elapse of the time TD, even if the increment of the output torque of the motor 2 is set constant irrespective the accelerator stroke.

This setting of the time TD may be conducted in such a way that the accelerator stroke and TD are brought into a completely proportional relationship by calculating TD, for example, based on multiplication of the accelerator stroke with a coefficient. In this embodiment, however, the accelerator stroke is divided into three sections of small, medium and large, whereby the time TD is set at three levels in such a way that the time TD is set at a time T1 when the accelerator stroke is small, at a time T2 when the accelerator stroke is medium, and at a time T3 when the accelerator stroke is large (T1<T2<T3). Of course, this stepwise setting of TD is not limited to the above and can be set at two level or at four or more levels.

Then, an elapse of the time TD is monitored (step C34). After the time TD has elapsed, this control is ended.

Individual changes of the shift signal, the motor output torque, the motor rotation speed and the directional control valve by such downshift control can be illustrated, for example, as shown in FIG. 9(A) to FIG. 9(D). Incidentally, in each of FIG. 9(A) to FIG. 9(D), period A corresponds to step 1, period B to step 2, period C to step 3, and period D to step 4, respectively.

When the shift signal is changed from the H range to the L range as illustrated in the diagram, the output torque of the motor 2 is held for the time TA (the first predetermined time) at the level at the time of the change-over controlled. Further, the directional control valve 39 is changed from the 2nd speed position (2nd) to the neutral position (EXT). As a result, the motor rotation speed gradually increases. Further, the actual clutch 16 (the second clutch) undergoes a response delay relative to a change-over of the directional control valve 39 to the neutral position, so that the clutch remains in a dragged state for a while.

As the dragging of the clutch in period A, i.e., step 1 is eliminated after an elapse of the first predetermined time (TA) or even before this elapse, if the motor rotation speed is sufficiently increased, period A is ended at this time point and the control then enters period B, i.e., step 2, where the output torque of the motor 2 is controlled to the above-mentioned target output MOUTSP. After that, the output torque of the motor 2 is held at the target output OUTSP during period B and period C, that is, during step 2 and step 3. As a result, the rotation speed of the motor 2 is promptly increased to a level such that no large shock is exerted to the vehicle.

When the time TB has elapsed after the entrance to period B, namely, step 2, the control enters period C, namely, step 3, where the directional control valve 39 is changed into the 1st-speed (1st) position. After this change-over to the 1st-speed (1st) position, it takes time until the clutch is connected. Thus, the time TC or so is required for the connection of this clutch.

When the clutch (1st-speed brake) is fully connected at the time point of an elapse of the third predetermined time (the time TC), the rotational speed of the motor 2 has already been reduced substantially to the target value. Upon connection of the 2nd-speed clutch 16, the rotational speed at the input side and that at the output side have already been equalized. The downshift to the first speed is therefore completed without exertion of a shift shock.

The control then enters period D, namely, step 4, where the motor output torque is allowed to gradually and linearly decrease to a motor output torque corresponding to an accelerator stroke. This period D is performed for the time TD (the fourth predetermined time). Because this time varies depending on the accelerator stroke, a linear increase of the motor output torque at a preset rate leads to a motor output torque corresponding to the accelerator stroke at the end of period D.

The gear shift control is completed here and the motor output torque is allowed to return to a motor output torque corresponding to an accelerator stroke.

By completing the downshift control through periods A to D (namely, step 1 to step 4), as described above, shifting can be smoothly performed without induction of a shift shock and further, by the reverse control of the motor, the equalization of the rotational speeds can be promptly achieved after the shifting. Incidentally, the processings in these periods A to D can be completed in a sufficiently short time, for example, within 1.5 seconds or less.

Further, even if the accelerator pedal is depressed in each of periods A, B and C, the resulting accelerator stroke remains irrelevant to the control and does not prevent the equalization of the rotational speeds. Accordingly, even if a driver performs, for example, an upshift operation with the accelerator pedal kept depressed, the upshifting can be performed smoothly and promptly without induction of a shift shock and moreover, the control is allowed to smoothly and promptly return to the output control of the motor 2 in accordance with an accelerator stroke.

Incidentally, it may be contemplated to set the times TA, TB, TC and TD, which are required for the respective periods A, B, C and D, for both an upshift and a downshift, separately.

Further, the above gear shift control method for the electric automobile, namely, the above upshift and downshift control can be applied not only to two-speed transmissions such as the one described above but also to transmissions having more gear positions.

CAPABILITY OF EXPLOITATION IN INDUSTRY

As has been described above, according to the gear shift control method of the present invention for the electric automobile, upon output of a gear-position change-over signal from the shifting means, output control of the drive motor which has been performed depending on an stroke of the accelerator pedal until that time is canceled, and the transmission is changed into the neutral position. Next, the output of the motor is controlled in accordance with a target motor output amount corresponding to a target motor rotation speed which is calculated on the basis of a vehicle speed at the time of a shifting operation and the gear ratio of a selected target gear position. Further, the transmission is changed to the target gear position and subsequently, the output of the motor is allowed to gradually return to an output amount corresponding to the stroke of the accelerator pedal. It is therefore possible to perform a prompt and smooth change-over of a gear position even when the accelerator pedal is kept depressed, thereby substantially contributing to improvements in the operating performance of the electric automobile.

We claim:

1. A gear shift control method for an electric automobile, said automobile being provided with an accelerator pedal for commanding an output amount of a drive motor, a transmission arranged between said motor and drive wheels and having plural gear ratios, and gear shift control means for outputting a gear-position change-over signal in response to any one of a changing operation of a gear position of the transmission by shifting operation means and in accordance with a running condition of a vehicle, comprising (i) canceling, upon output of said change-over signal from said shifting operation means, output control of said motor, which has been controlled in accordance with a stroke amount of said accelerator pedal, and changing said transmission to a neutral position;

(ii) controlling, after completion of said first step, an output amount of said motor in accordance with a target motor output amount corresponding to a target motor rotation speed, said target motor rotation speed being calculated based on a vehicle speed at a time of said changing operation and a gear ratio of a selected target gear position;

(iii) shifting, after completion of said second step, said transmission to said target gear position; and (iv) allowing, after completion of said third step, an output amount of said motor to gradually return to an output amount corresponding to the stroke amount of said accelerator pedal.

2. The gear shift control method according to claim 1, wherein said first step includes, gradually reducing the output amount of said motor to zero when said gear-position change-over signal from said shifting operation means is an upshift signal.

3. The gear shift control method according to claim 1, wherein said first step includes, holding the output amount of said motor when said gear-position change-over signal from said shifting operation means is a downshift signal.

4. The gear shift control method according to claim 1, further comprising;

terminating said first step when any one of a preset first predetermined time has elapsed and a rotation speed of said motor has changed by at least a predetermined value.

5. The gear shift control method according to claim 1, wherein said second step includes, setting the output amount in a reverse direction as said target motor output amount when said gear-position change-over signal from said shifting operation means is an upshift signal.

6. The gear shift control method according to claim 1, further comprising:

terminating said second and third steps when a preset second predetermined time and a preset third predetermined time have elapsed, respectively, wherein said second step includes, setting said output amount of said motor by adding a correction value to a preceding output amount of said motor, said correction value being obtained by multiplying, with an inertia torque factor corresponding to a rotation system of said motor, a first value obtained by dividing, with a sum of said second predetermined time and said third predetermined time, a second value obtained by subtracting from said target motor rotation speed an actual motor rotation speed at a time said second step is initiated.

7. The gear shift control method according to claim 1, further comprising:

completing said third step when any one of a preset third predetermined time has elapsed and a difference between an actual motor rotation speed and said target motor rotation speed has become equal to or smaller than a predetermined value.

8. The gear shift control method according to claim 1, wherein said fourth step includes, allowing said output amount of said motor to resume to the output amount corresponding to the stroke amount of said accelerator pedal over a fourth predetermined time which is set longer as the stroke amount of said accelerator pedal becomes greater.

9. The gear shift control method according to claim 1, wherein said gear shift control means is provided at least with gear position memory means defining each gear position in accordance with running conditions of said vehicle, said running conditions includes at least the stroke amount of said accelerator pedal and the vehicle speed; and said gear-position change-over signal is outputted from said gear position memory means in accordance with the running conditions of said vehicle.

10. The gear shift control method according to claim 1, wherein said steps (i) to (iv) are executed consecutively.

11. A method for controlling a gear shift of a transmission for an electric vehicle, the electric vehicle having a motor controlled based on a depression amount of an accelerator pedal, comprising:

detecting a change-over signal for shifting from a first position to a second position;

canceling output control of the motor based on the accelerator pedal depression amount, when the change-over signal is detected;

shifting said transmission from a first position to a neutral position;

calculating a target rotational speed of the motor based on a vehicle speed and a gear ratio of the second position;

controlling the motor such that an actual rotational speed of the motor substantially coincides with the calculated target rotational speed;

shifting said transmission from the neutral state to the second position; and resuming control of the motor based on the accelerator pedal depression amount.

12. The method of claim 11, wherein said canceling step cancels the control of the motor based on the accelerator pedal depression amount until the second position is established.

13. The method of claim 11, wherein said controlling step and the step of shifting said transmission from the neutral state to the second position are executed such that the second position is obtained substantially at the same time as the actual rotational speed coincides with the target rotational speed.

* * * * *